United States Patent [19]

Sansone

[11] Patent Number: 5,545,858
[45] Date of Patent: Aug. 13, 1996

[54] METHOD FOR PROCESSING AND INTERPRETING WIDE BAND FM SEISMIC SIGNALS

[76] Inventor: Stanley A. Sansone, 621-17th St., Suite 2630, Denver, Colo. 80293

[21] Appl. No.: 255,048

[22] Filed: Jun. 7, 1994

Related U.S. Application Data

[60] Continuation-in-part of Ser. No. 51,560, Apr. 21, 1993, Pat. No. 5,335,208, which is a division of Ser. No. 901,517, Jun. 16, 1992, Pat. No. 5,231,252.

[51] Int. Cl.$^6$ ..................................................... G01V 1/16
[52] U.S. Cl. ........................... 181/122; 367/49; 367/153; 367/155; 181/112
[58] Field of Search ................................ 367/38, 43, 49, 367/153, 155; 181/112, 122

[56] References Cited

U.S. PATENT DOCUMENTS

| | | | |
|---|---|---|---|
| 2,688,124 | 8/1954 | Doty et al. | 340/15 |
| 2,757,356 | 7/1956 | Haggerty | 340/7 |
| 4,458,339 | 7/1984 | Wason | 367/14 |
| 4,875,166 | 10/1989 | Carroll et al. | 364/421 |
| 5,077,697 | 12/1991 | Chang | 367/31 |
| 5,231,611 | 7/1993 | Laznicka, Jr. | 367/149 |
| 5,289,433 | 2/1994 | Cowles et al. | 367/34 |

*Primary Examiner*—J. Woodrow Eldred
*Attorney, Agent, or Firm*—William E. Hein

[57] ABSTRACT

A method for determining a unique signal representing the earth's response between a transmitter and receivers when conducting a seismic survey involves the steps of receiving a seismic signal set that comprises a plurality of different output frequency signals having known amplitude and phase characteristics, selectively combining the different output frequency signals to form the unique signal, and recording values of amplitude, phase, and frequency of the unigue signal. A method of conducting a modulated seismic survey involves the steps of providing seismic sensors capable of receiving a modulated seismic signal comprised of different frequency signals, transmitting modulated seismic energy information into the earth, and recording indications of reflected and refracted seismic waves sensed by the seismic sensors in response to transmission of the modulated seismic energy information into the earth.

28 Claims, 6 Drawing Sheets

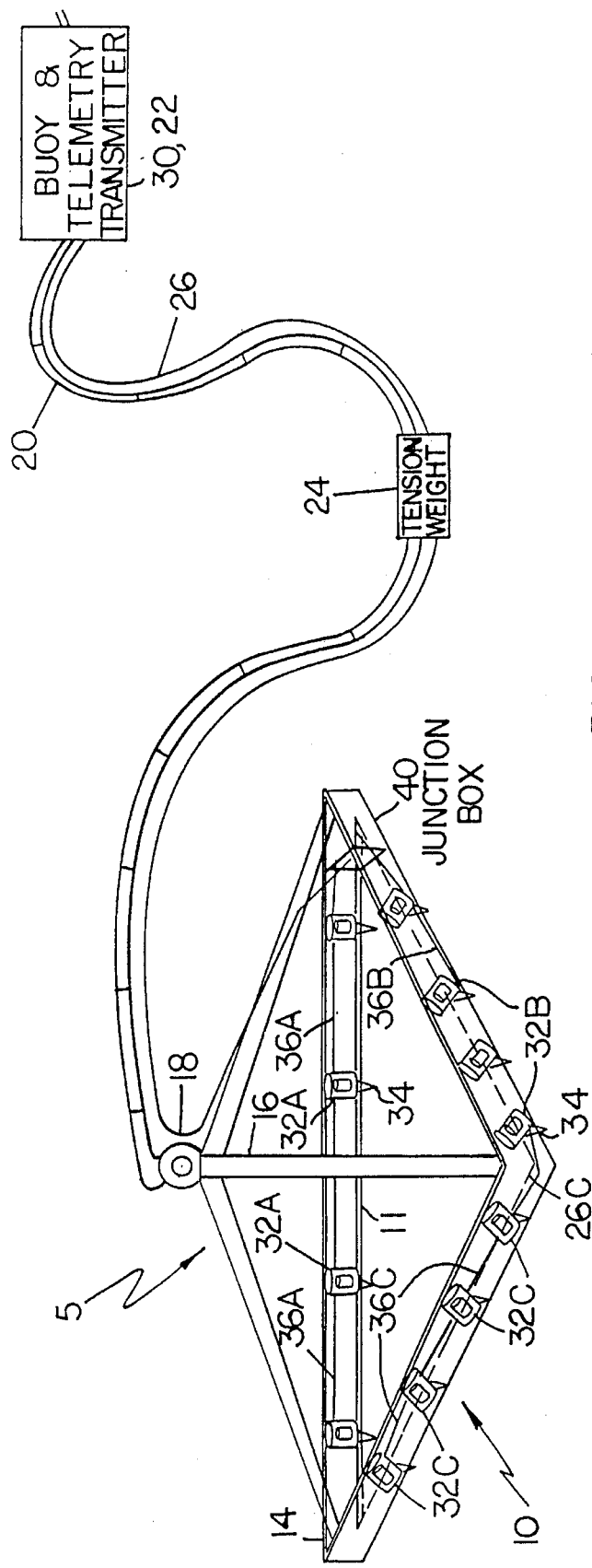
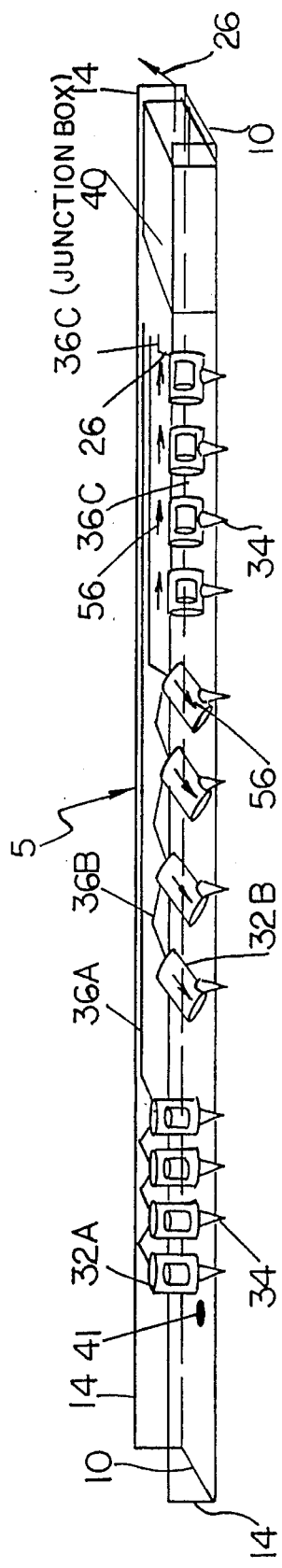

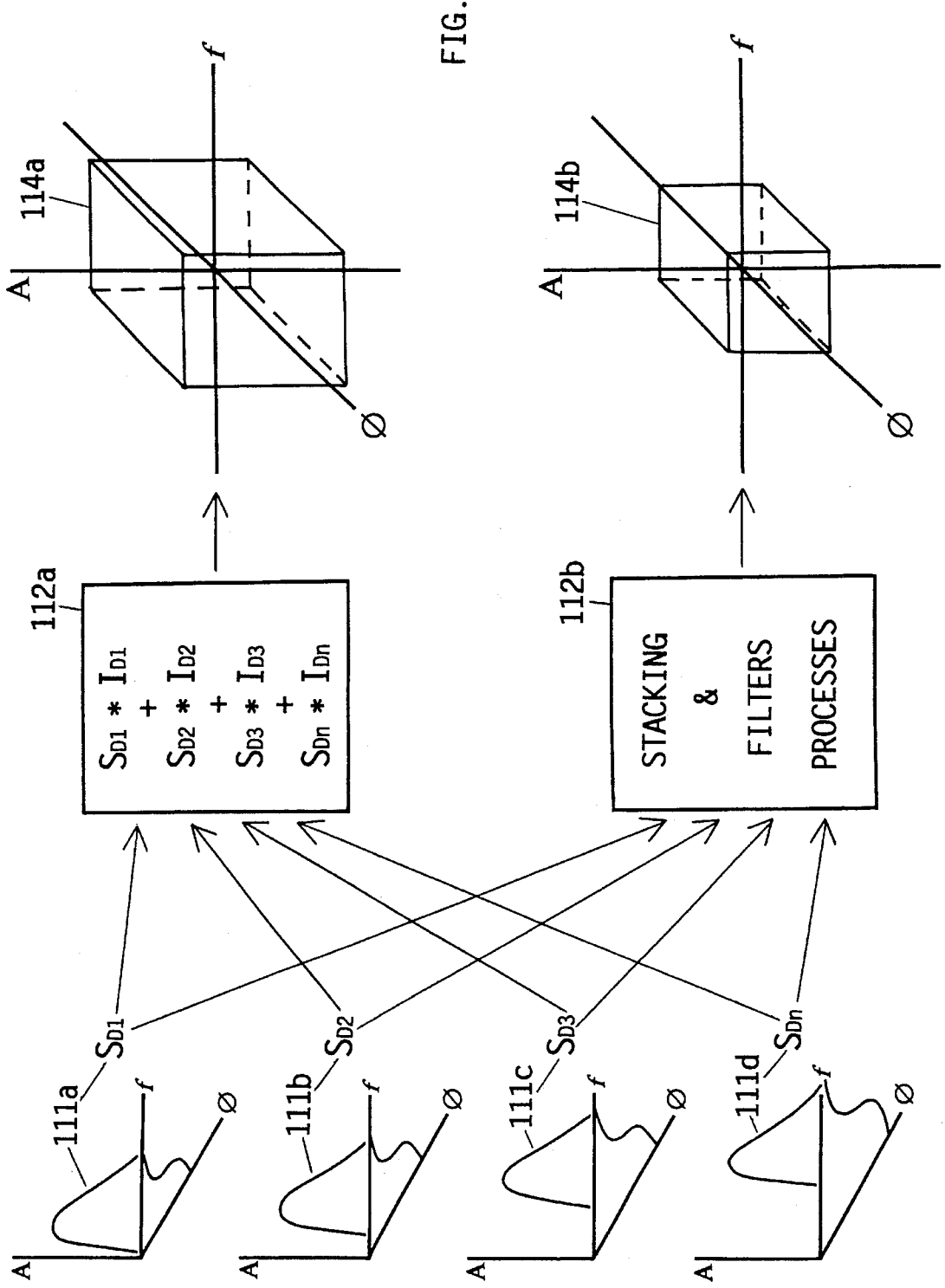

METHOD FOR PROCESSING AND INTERPRETING WIDE BAND FM SEISMIC SIGNALS

REFERENCE TO RELATED APPLICATION

This is a continuation-in-part application of U.S. patent application Ser. No. 08/051,560 filed on Apr. 21, 1993, now U.S. Pat. No. 5,335,208, which is in turn a divisional application of U.S. patent application Ser. No. 07/901,517 filed on Jun. 16, 1992, now issued as U.S. Pat. No. 5,231, 252.

BACKGROUND AND SUMMARY OF THE INVENTION

This invention relates generally to the use of seismic data processing and interpretation and more specifically to the combination of multiple seismic signals, the improvement of signal to noise ratios, and the modulation and demodulation of seismic information.

Originally, acoustic and seismic information was gathered in a seismic survey for the primary purpose of determining arrival times of seismic events, thus gaining knowledge of the subsurface. These seismic surveys utilized either seismic motion or pressure sensitive sensing transducers within an array that was deployed in or on the earth or in a body of water, respectively, for the purpose of recording seismic acoustic information. The seismic information that is output and recorded from one of these arrays consists typically of one signal. In these processes, the output is of a type of amplitude modulated signal that is recorded for processing and subsequently used to interpret subsurface structure and composition.

Such a use of an amplitude modulated signal imposes significant constraints on the improvement of signal to noise characteristics of the returning earth signal and further constrains the ability to determine subsurface structure and composition. It has long been recognized that there are many forms and types of noise, both coherent and random, which are sensed and recorded in a seismic system. Many types of noise are significant in certain frequency bands commonly narrower than the total bandwidth of sensed and recorded seismic data. For example, ground roll is commonly a low frequency seismic energy that travels directly from source to receiver along the ground. Ground roll commonly lies in the frequency range of 10–30 Hz. Likewise, air blast is the energy that travels through the air from source to receiver. This type of noise commonly has frequency characteristics in the 40–80 Hz range. In addition, there are many other types of noise which have characteristic signatures.

Amplitude modulated signals restrict the use of more detailed information such as amplitude, phase, frequency, and interval velocity because of superposition of signal and, especially, superposition of noise. As noise, an undesirable signal, and the desired seismic signal are recorded by one type of receiver, they are superimposed. The ability to separate these individual signals is limited to processing the amplitude modulated output signal received by this type of receiver. In addition, phase characteristics of the desired signal and the noise signal are further constrained because of superposition. In fact, information is commonly recorded with one type of receiver whose phase response is nonlinear.

Thus, the use of an output signal characterized by an amplitude modulated signal imposes significant constraints on the improvement of signal to noise characteristics of the returning earth signal and further constrains the ability to determine subsurface structure and composition. The ability to further improve signal to noise is further contrained by the inability to solve harmonic distortion or the representation of two or more superimposed harmonics. This is also true for the processing and interpretation of three-component seismic information.

Originally, seismic acquisition constractors used geophone and hydrophone arrays with identical individual geophones and hydrophones consisting of transducers of one natural or resonant frequency all being connected by a flexible wire for the purposes of electrical communication and, in the case of hydrophones, position maintenance through drag. A serious impediment exists in fast moving bodies of water such as rivers and tidal areas.

Seismic acquistion in the marine environment has typically utilized a number of hydrophone arrays strung together by wire and towed behind a boat. Movement of the boat deploys a drag type seismic cable containing the hydrophones and hydrophone arrays in a straight line. Tidal marine conditions exist in coastal areas where strong horizontal ocean currents can easily destroy seismic equipment. Fast moving bodies of water like rivers also have very strong currents that have made previous attempts to acquire seismic reflection data in these water environments generally unsuccessful.

Navigation and position maintenance of a drag type seismic cable containing hydrophone arrays in tidal marine and river environments is very treacherous. Strong currents easily disrupt loosely connected geophone arrays strung together by wire. Sheltering of marine and land geophones from noise producing water and wind turbulence is limited.

Exemplary of the prior art is U.S. Pat. No. 2,688,124 to Doty et al., which is directed to a process of emitting signals having different frequency components. The process of this reference is subject to the undesirable collection of the controlled input of multiple frequencies by a single type of detector. Additionally, benefits are limited to correlation and determination of the time-phase relationship of a travel time path through the process of time multiplexing.

U.S. Pat. No. 4,875,166 to Carroll et al. is directed to increasing the bandwidth of recordable seismic information. The system taught by this reference is subject to sensing all signals within a single type of sensor early on thus limiting signal to noise improvement.

U.S. Pat. No. 5,289,433 to Cowles et al. teaches a method and apparatus for faithfully recording borehole acoustical signals. An attempt is made to reduce noise by providing a semi-rigid reciever array for the purpose of decoupling certain types of noise. A plurality of different natural or resonant frequency sensors are deployed, the output of which is subsequently combined for the purpose of optimizing multifrequency output and bandwidth. This reference teaches that noise is eliminated mechanically by decoupling, much like the well known surface technique of array distribution.

U.S. Pat. No. 5,231,611 to Laznicka is directed to a remotely deployable, unpowered sonar sensor array. This reference discloses the use of a hydrophone array serving as an acoustic phase array based on the known phase relationship between different natural or resonant frequency transducers.

U.S. Pat. No. 4,405,036 to Brede is directed to an apparatus for stabilizing a drag type seismic cable containing hydrophone arrays through the use of a boat at one end of the tow line and a data collection truck based on the shore. The apparatus of Brede is subject to undesirable attenuation of the hydrophone signal due to the reflection coefficient of the seabed.

U.S. Pat. No. 4,463,451 to Warmack teaches a way to stabilize and maintain the relative position of a single geophone in a water covered area using a recording float and an elaborate tension filter, which is expensive and difficult to deploy.

U.S. Pat. No. 2,738,488 to MacKnight is directed to a single drag type cable employing single geophone attachments, which have questionable coupling and position control in tidal marine areas and fast moving rivers.

U.S. Pat. No. 5,014,813 to Fussell is directed to a waterproof housing for single seismic sensor typically used in marshes and other areas of quiet water. The typical marsh geophone is elongate and is made to be coupled or positioned in the mud. Groups of geophones are connected by wire for the purpose of electrical communication. Planted singly, these geophones arrays can easily become decoupled and are ineffictive in tidal marine areas and rivers.

U.S. Pat. No. 4,138,658 to Avedik is directed to a complex pickup, comprising a detachable frame, a hydrophone and two geophones that are used in water depts of 100–200 meters in connection with refraction surveys. This arrangement suffers from poor earth coupling, since the geophones are not individually planted in the earth. Only the frame is directly coupled to the earth through the three feet that are provided on the underside thereof. Therefore, the geophones sense refractions through the frame, rather than directly from the earth.

Seismic acquisition on land has in the past utilized a plurality of geophone arrays strung together by wire for the purpose of better sampling, notching the resulting frequency spectrum, and electrical communication to a multichannel recording unit. Individual geophone arrays normally consist of a plurality of geophones that are planted in spaced groupings of 12–24 geophones over distances of 55–440 feet by unskilled operators who have little regard for accurate positioning and proper orientation of the geophones. The distribution of the geophone group is a further attempt to eliminate ground roll by notching the data set. Terrain changes are not usually taken into account. When these arrays of geophones are planted on hillsides, plane reflection waves coming from different directions impinge on the group array at different angles, thereby causing misalignment of the response signals.

In an attempt to improve data quality, three-dimensional geophones have been used to measure motion in three orthogonal directions. Each three-dimensional geophone typically comprises three separate unidirectional geophones that are oriented for three-dimensional pickup and housed in a single enclosure, as typified by the geophone described in U.S. Pat. No. 5,010,531 to McNeel. These devices are disadvantageous in that they are difficult to repair, require strict horizontal placement, and contain identical transducers.

It is therefore an object of the present invention to provide a seismic sensor array containing a plurality of seismic sensors in a configuration that results in a more accurate measurement of seismic reflection energy.

It is another object of the present invention to provide a seismic exploration apparatus that employs an improved communication system from source to receiver.

It is another object of the present invention to provide a seismic exploration method in which modulated seismic signals are used to obtain a more accurate representation of the subsurface.

It is another object of the present invention to provide a seismic exploration method in which improved noise rejection and isolation results in improved imaging, resolution, and interpretation of subsurface structure and composition.

It is another object of the present invention to provide a seismic exploration method resulting in a more accurate representation of seismic frequency of the recorded seismic information for the purpose of improving imaging, resolution, and interpretation of subsurface structure and composition.

It is another object of the present invention to provide a seismic exploration method resulting in a more accurate representation of seismic phase of the recorded seismic information for the purpose of improving imaging, resolution, and interpretation of subsurface structure and composition.

It is another object of the present invention to provide a seismic exploration source system for use in an angle modulation seismic survey.

It is another object of the present invention to provide a seismic exploration apparatus employing a receiver system for use in an angle modulation and demodulation seismic survey.

It is another object of the present invention to provide a seismic exploration method apparatus employing an improved seismic communication system for use in isolating and defining both a desired seismic signal and an undesired noise signal.

It is another object of the present invention to provide a seismic exploration method in which an angle modulated seismic signal is processed at the array site.

It is another object of the present invention to provide a seismic exploration method in which an angle modulated seismic signal is processed at the recording site.

It is another object of the present invention to provide a seismic exploration method in which an angle modulated seismic signal is processed interactively during an interpretation stage.

It is another object of the present invention to provide a seismic exploration apparatus in which deployment and location of seismic sensors is robotized.

BRIEF DESCRIPTION OF THE DRAWINGS

FIG. 2 is an illustration of the seismic sensor platform of FIG. 1 showing how a plurality of unidirectional seismic sensors are oriented to provide multidirectional seismic sensing.

FIG. 3 is an illustration of a seismic sensor platform for use on land in which groups of unidirectional seismic sensors are positioned with different orientations to provide multidirectional seismic sensing.

FIG. 7 is an illustration of the receiver and signal processing portions of the seismic communication system of FIG. 5, together with associated information output.

DESCRIPTION OF THE PREFERRED EMBODIMENT

Figure 1:
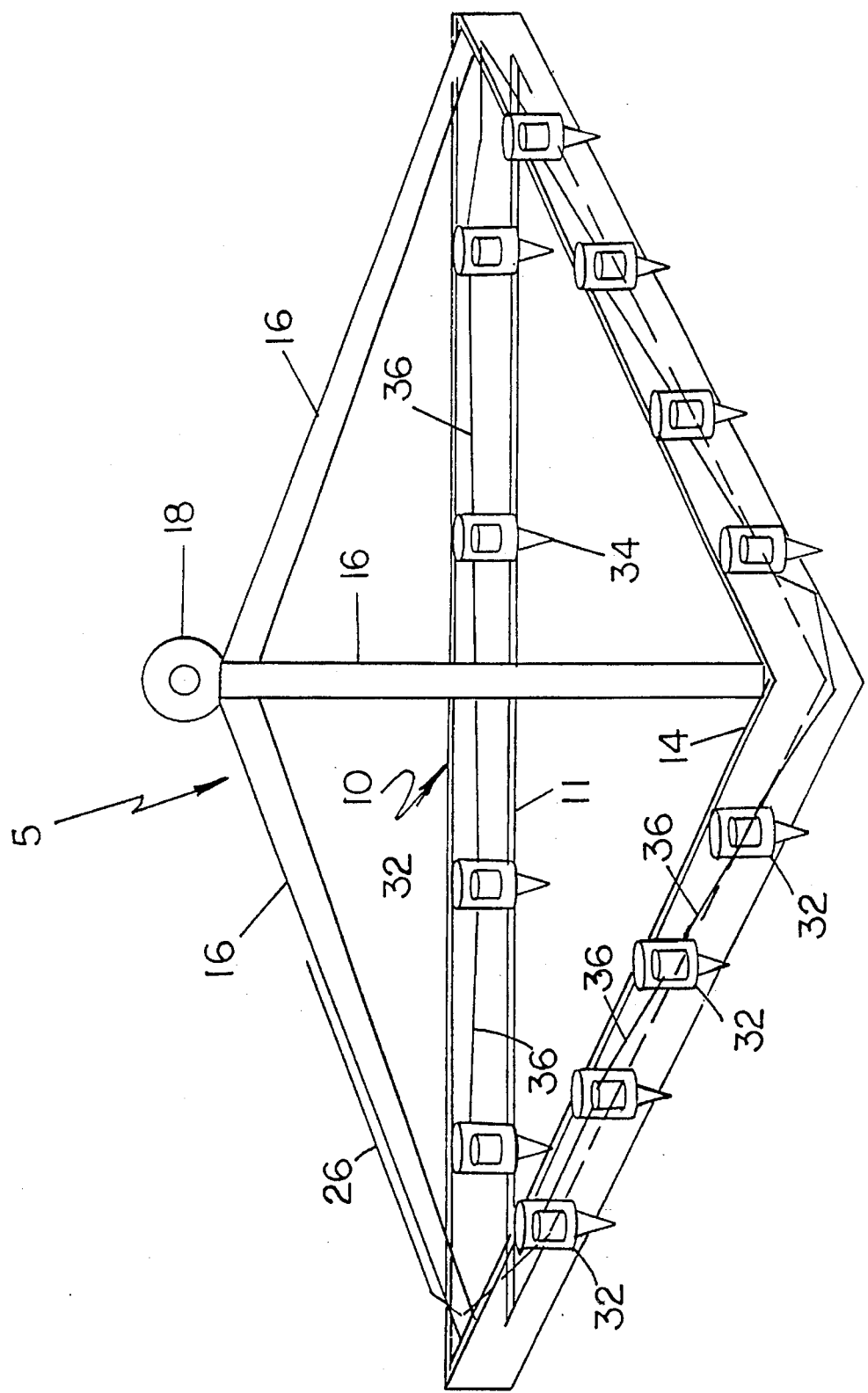
FIG. 1 is an illustration of a seismic sensor platform constructed in accordance with the present invention for use in tidal marine areas and fast moving rivers.

Referring now to FIGS. 1 and 2, there is shown a seismic sensor platform 5 having an open triangular base 10. Triangular base 10 is L-shaped in cross section to include a vertical deflector member 14 and an inwardly directed horizontal shelf member 11. The horizontal shelf member 11 of triangular base 10 includes a plurality of holes for receiving a number of seismic sensors 32, which may comprise commercially available geophones, for example. Depending on the method of attachment of the particular type of seismic sensors 32 being employed, the holes in horizontal shelf member 11 of triangular base 10 may be threaded. Alternatively, seismic sensors 32 may simply be welded to the triangular base 10. Vertical deflector member 14 of triangular base 10 is of sufficient height to protect the seismic sensors 32, an electrical cable 36 connecting them, and an electrical junction box 40. Triangular base 10 is preferably constructed of a heavy, durable non-magnetic material. Three stabilizer support elements 16 are attached to triangular base 10 to form a tripod arrangement rising above triangular base 10 and employed for raising and lowering seismic sensor platform 5. An attachment ring 18 is provided at the top of the tripod arrangement formed by stabilizer support elements 16. Stabilizer support members 16 are preferably fabricated of steel. Alternatively, they may be fabricated of other materials such as rope or plastic. As illustrated in FIG. 2, a cord 20 is coupled to attachment ring 18 to facilitate raising and lowering of seismic sensor platform 5. In shallow water, an operator may position seismic sensor platform 5. In deeper water, it may be lowered from a boat. A buoy 22 is attached to a distal end of cord 20. Cord 20, which may comprise a nylon rope, includes incremental distance markings so that the user can readily determine the depth at which the seismic sensor platform 5 is anchored in a body of water. A tension weight 24 is positioned along cord 20 a short distance from sensor platform 5 to prevent the transmission of noise caused by the motion of cord 20 in the water above sensor platform 5. A conventional seismic telmetry transmitter 30 is positioned along cord 20 adjacent bouy 22 to transmit electrical signals received from seismic sensors 32 via a takeout wire 26 that is routed along cord 20. These signals are typically transmitted to a remotely located recording vehicle.

In accordance with the embodiment of seismic sensor platform 5 illustrated in FIG. 1, a plurality of individual seismic sensors 32 that may comprise conventional geophones, are attached along the horizontal shelf member 11 of triangular base 10. A sensor spike 34 that screws onto a protruding threaded stud on each of the seismic sensors 32 is employed to attach each of the seismic sensors 32 to triangular base 10 and also serves to individually anchor them in the earth at the bottom of the body of water into which seismic sensor platform 5 is submerged. Alternatively, sensor spikes 34 may be connected to the underside of triangular base 10 in close proximity to corresponding ones of the seismic sensors 32. A group wire 36 electrically connects the individual seismic sensors 32 as a series or parallel group and is itself connected to a takeout wire 26.

In accordance with the embodiment of sensor platform 5 illustrated in FIG. 2, groups of individual seismic sensors 32A, 32B, 32C are attached to triangular base 10 in a manner similar to that described in the preceding paragraph. The group of seismic sensors 32A are oriented vertically to sense a vertical component of seismic reflections. The groups of seismic sensors 32B and 32C are oriented horizontally such that the axes of seismic sensors 32B are perpendicular to the axes of seismic sensors 32C. The group of sensors 32B thereby senses a horizontal X-component of seismic reflections, while the group of seismic sensors 32C senses a horizontal Y-component of seismic reflections. The individual seismic sensors of each of the groups 32A, 32B, 32C are electrically connected in series or parallel, as desired by the user, through the use of group wires 36A, 36B, 36C which are routed to an electrical junction box 40 mounted at any convenient location on sensor platform 5. Junction box 40 typically contains a conventional power source, as required, along with conventional electrical circuitry for data signal enhancement and subsequent transmission via takeout wire 26. Junction box 40 may also be used to house a transponder for providing a signal that will permit accurate location of seismic sensor platform 5 when it is anchored at the bottom of a deep body of water.

Referring now to FIG. 3, there is is shown an alternative embodiment of a seismic sensor platform 5 for use on land rather than under water, as in the case of the embodiment illustrated in FIGS. 1 and 2. In the embodiment of FIG. 3, seismic sensor platform 5 is configured as a U-shaped channel having a flat base member 10 and a pair of vertical side members 14. As described in the preceding paragraph, the seismic sensor platform 5 of FIG. 3 includes groups of unidirectional seismic sensors 32A, 32B, 32C mounted on the base member and oriented as illustrated to sense the vertical component, horizontal X-component, and horizontal Y-component of seismic reflections. When used on flat terrain, each one of the group of seismic sensors 32B is aligned so its axis is parallel to the longitudinal axis of seismic sensor platform 5, and each one of the group of seismic sensors 32C is aligned so its axis is perpendicular to the longitudingal axis of seismic sensor platform 5. When used on a hillside, for example, the seismic sensor platform 5 is oriented, using leveling bubble 11 to insure that it is level along its longitudinal axis, and each one of the group of seismic sensors 32B is rotated so as to be aligned with a seismic line on the hillside, and each one of the group of seismic sensors 32C is rotated 90 degrees with respect to the orientation of the group of seismic sensors 32B. Vertical side members 14 of seismic sensor platform 5 are of sufficient height to protect the seismic sensors 32A, 32B, 32C from physical damage as well as from wind noise. A bubble level 41 may be mounted on the base member as an aid in leveling seismic sensor platform on uneven terrain. An electrical junction box 40 that is employed for the same purposes described in the preceding paragraph is mounted at one end of seismic sensor platform 5. Positioning arrows 56 are marked on each one of the groups of seismic sensors 32B and 32C for use as an aid to correctly orient those groups of seismic sensors.

Figure 4:
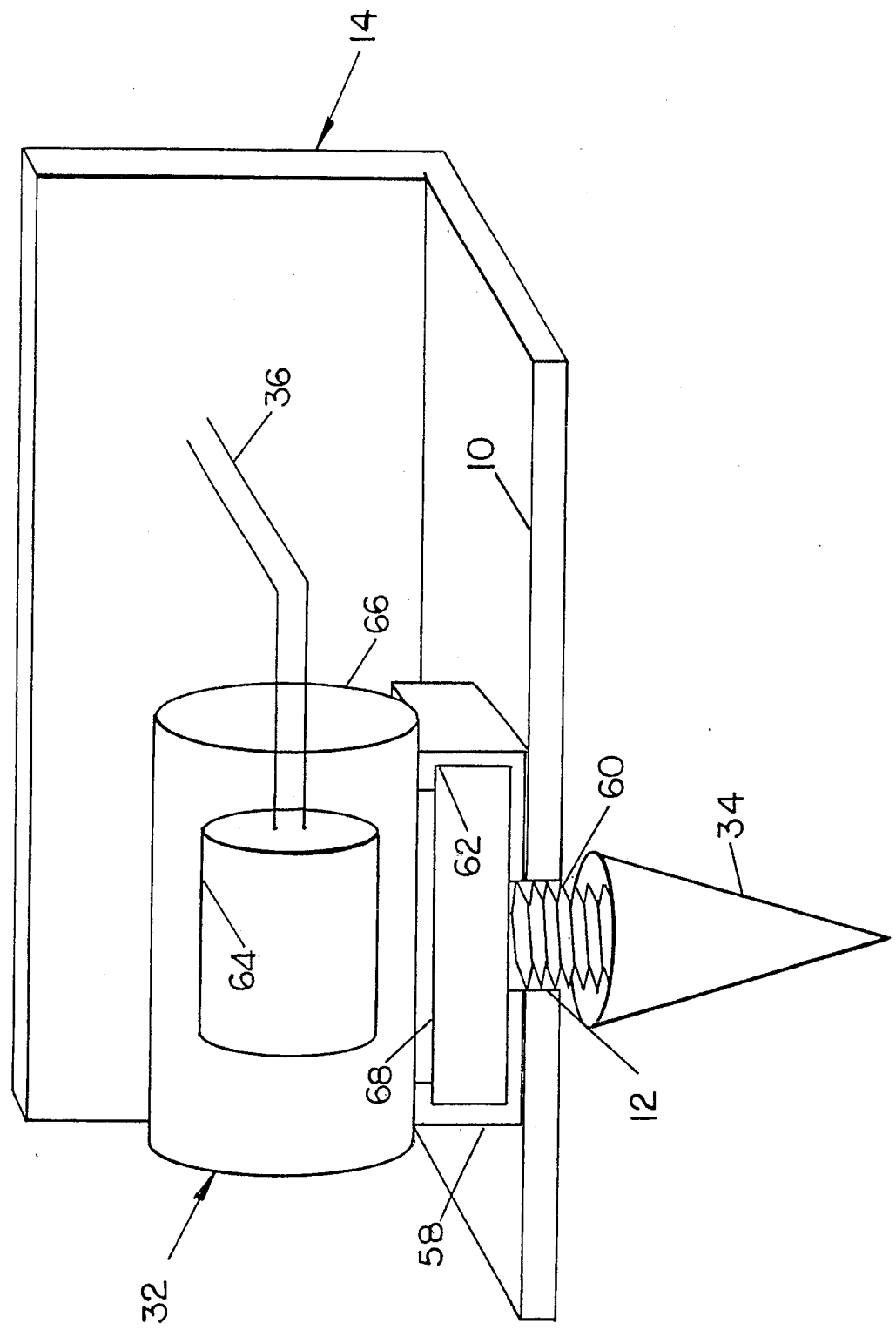
FIG. 4 is an illustration of a rotatable housing for mounting a horizontal seismic sensor in the seismic sensor platforms of FIGS. 1–3.

Referring now to FIG. 4, there is shown a rotatable housing for use in mounting the seismic sensors 32A, 32B, 32C illustrated in FIGS. 2 and 3. Each individual seismic sensor 32 snaps into a base casing 58 having a downwardly projecting threaded stud 60 that is placed in a hole in the horizontal shelf member 11 of FIG. 2 or base member 10 of FIG. 3. The conically-shaped sensor spike 34, having a threaded cavity therein, is screwed onto threaded stud 60 to secure the base casing 58. A snap-on rib protrusion 62 in base casing 58 is provided for receiving a transducer 64 that is encased within cylindrical casing 66. Casing 66 snaps into base casing 58. A circular notch 68 fits over snap-on rib protrusion 62 that permits 90 degrees of rotation of the cylindrical casing 66 with respect to base casing 58 to thereby facilitate proper orientation of the seismic transducer 64.

Alternatively, the groups of seismic sensors 32A, 32B, 32C of FIGS. 2 and 3 may comprise groups of seismic sensors in which each seismic sensor within a particular group has a selected natural frequency to thereby optimize the multifrequency output of the groups of seismic sensors 32A, 32B, 32C.

Figure 5:
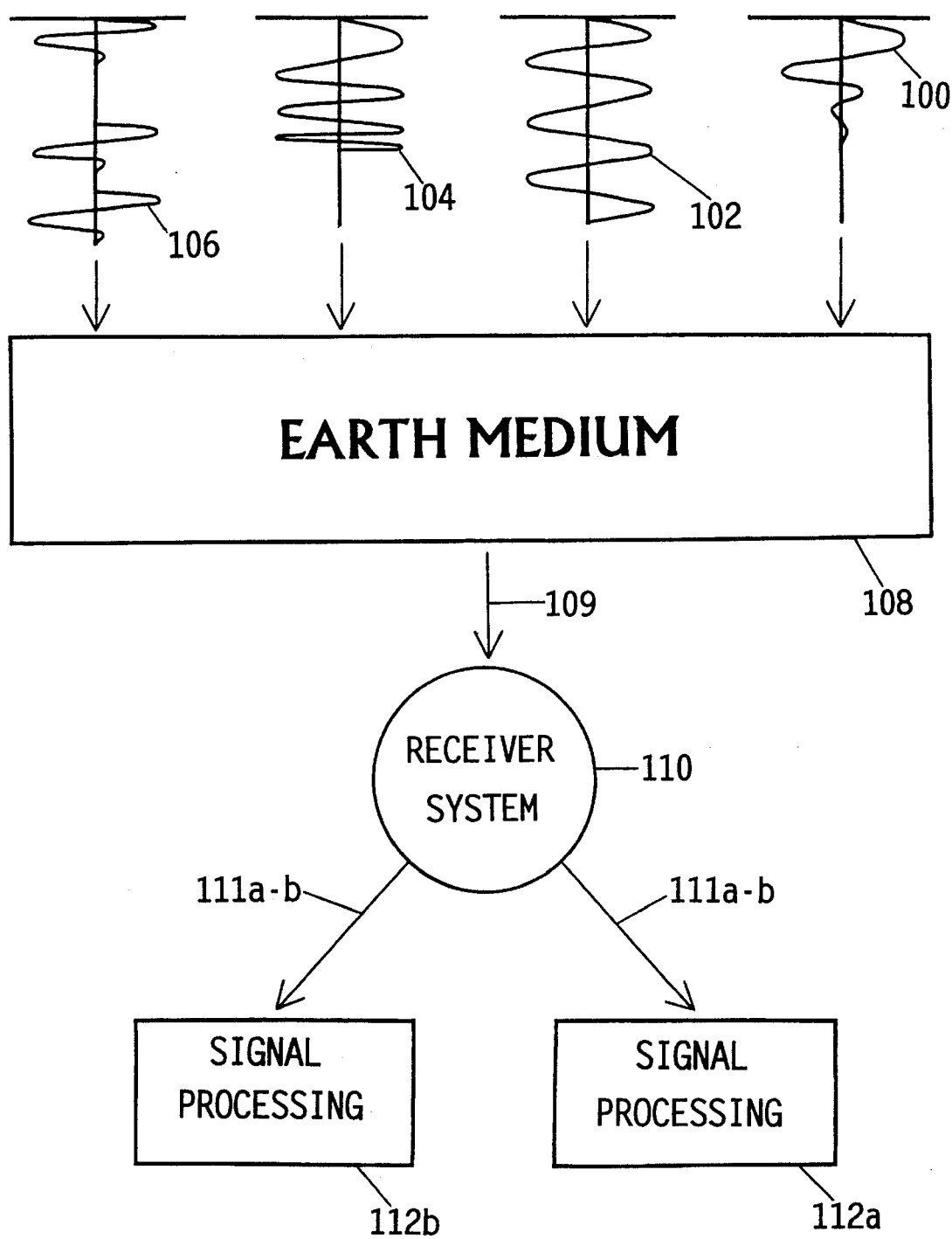
FIG. 5 is an illustration of a seismic communication system depicting the input or transmission of seismic energy into the earth, a receiver system, and a signal processing system.
Figure 6A:
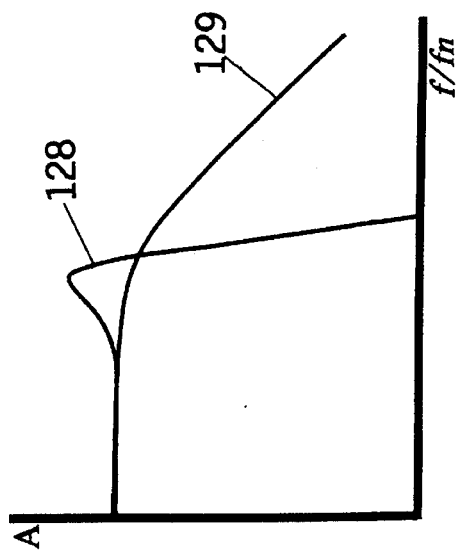
FIGS. 6A–D are graphs illustrating amplitude, phase, and frequency responses of various transducers employed in the seismic communication system of FIG. 5.
Figure 6B:
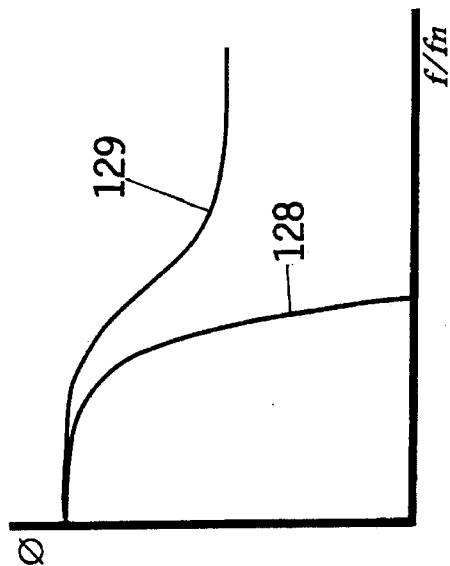
Figure 6C:
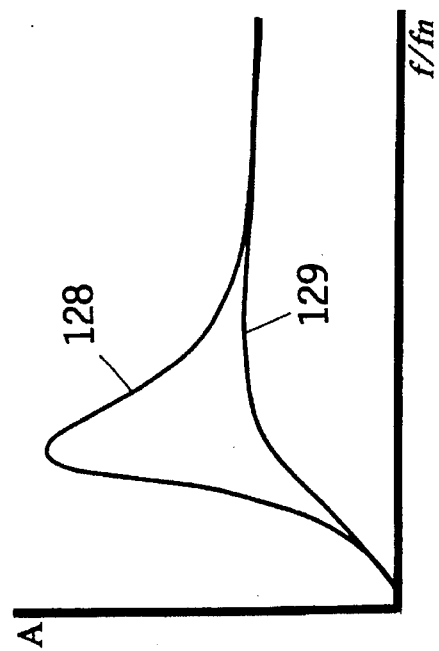
Figure 6D:
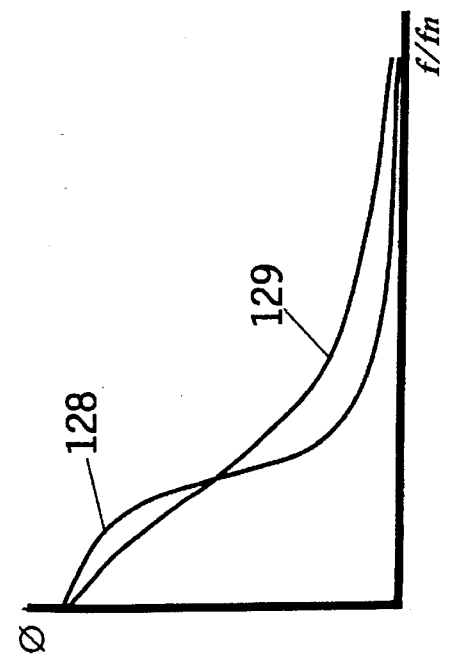

Referring now to FIG. 5, there is shown a seismic communication system employed to obtain information about the earth, At least one type of input energy must be activated into the earth. Different types of input energy or energy sources are depicted as blocks 100, 102, 104, 106. The energy source 100 is represented by a large pulse commonly associated with an explosive source, such as dynamite, a weight drop or an air gun. The energy source 102 is represented by a monotone of limited frequency. It is expected that the use of such a source 102 is further used in conjunction with additional monotone sources of different frequencies. The energy source 104 is a unique, non-repetitive time varying signal. It is recognized that energy source 104 is a frequency or phase modulated signal composed of a carrier frequency and seismic information or message. Likewise, energy source 106 is a timed pulse source or a series of time-spaced bursts. Phase and frequency modulation fall under the general class of modulation techniques known as angle modulation. Specifically, waveform 106 represents a pulse modulated source composed of seismic information to be transmitted. At least one energy source transmitts seismic energy into the earth 108. Once the energy has been transmitted into the earth 108, it is recovered by the receiver system 110. The seismic energy released into the earth may take many paths. For example, the energy may go directly to the receiver system as in the case of ground roll or direct transmission; it may be refracted along some acoustical interface, such as a rock layer; or it may be reflected from some acoustical interface. It should be noted that the above embodiment is not limited in frequency content range. Group penetrating radar for use in the definition of subsurface structure and composition works in the megahertz frequency range.

FIGS. 6A–D illustrate a typical sensor in the receiver system 110. A displacement, velocity or acceleration transducer generally exhibits output or amplitude vs. frequency characteristics shown in FIG. 6A and corresponding phase vs. frequency characteristics shown in FIG. 6C. Likewise, pressure transducers generally exhibit output or amplitude vs. frequency characteristics shown in FIG. 6B and corresponding phase vs. frequency characteristics shown in FIG. 6D. The abscissa of each of these graphs represents a measurable frequency divided by the natural or resonant frequency (f/fn). Each graph shows two response curves, one a lightly damped curve 128, and the other a highly damped curve 129. In the preferred embodiment of the present invention, multiple sensors are employed. In addition, multiple laser sources linked to matched optical fibers that respond to acoustic pressure energy may be employed as optical transducers.

FIG. 7 illustrates the receiver system output and signal processing flow. A receiver apparatus may consist of transducers of different natural frequencies or different resonant frequencies. The importance of the disclosed apparatus is that it allows the recording of energy transmitted through the earth to be received and sensed in different narrower signal bands. The output from different sensors may be represented as an output signal $S^D$, 111a, 111b, 111c, 111d. It is important to the receiver system that the amplitude and phase characteristics of the individual transducers or sensors be known. It is recognized that the impulse response of the individual sensors can be linear to nonlinear and that there are advantages, as well as disadvantages, in the different portions. In each case, the amplitude (A), phase (∅), and frequency (f) or wavelength, as in the case of an optic resonant hydrophone array, characteristics of the individual sensors or collective set are known. By convolving the respective output signals 111a, 111b, 111c, 111d with the inverse properties, $I^D$ of the respective sensors and then summing the products produces a unique complex signal 114 containing detailed information on amplitude, phase, and frequency. The unigue complex signal 114a displays the potential volume of real and imaginary data set, which includes sensed and recorded desirable and undesirable signals. It is also obvious that an imaginary portion exists as can be developed from the use of a Hilbert transform. In a strict frequency demodulation process, each signal may be condition by limiters, gain functions, and filters and further matched to a frequency modulated energy source or sources. in the signal processing block 112a, all acoustic information is known by frequency, phase, and amplitude and thus can be processed to remove a desirable signal from an undesirable signal. This unique complex signal may now be further processed, including at least stacking, filtering, and migration for the purpose of enhancing the imaging and resolution of the subsurface structure and composition.

In another embodiment of the present invention, signal processing and analysis may be performed on the individual output signals $S^d$, 111a, 111b, 111c, 111d through the well known processes of stacking and filtering in an attempt to remove noise or other undesirable signals before the combining output signals $S^D$, 111a, 111b, 111c, 111d. Several forms of stacking and filtering include vertical stacking, common-depth-point stacking uphole stacking, apparent velocity filtering, diversity stacking, coherency filtering, and migration. The stacking and filtering process 112b is used to remove an undesirable signal from a desirable one. The unique complex signal 114b that results is without the undesirable portion of the unique complex signal. This unique complex signal can now be further processed, which at least includes stacking, filtering, and migration for the purpose of enhancing the imaging and resolution of the subsurface structure and composition.

In providing these processes, an expanded bandwidth can be accomplished, along with improved signal to noise ratio, to thereby facilitate better imaging and resolution of the subsurface. In addition, the signal travel time and velocity information may be better understood.

I claim:

1. A seismic survey method for receiving and processing a complex accoustical seismic signal that is produced in response to actuation of a seismic source, the method comprising the steps of:

positioning a plurality of seismic transducers, each of which has an associated different resonant frequency, for receiving the complex accoustical seismic signal, each of the transducers providing a different output signal having unique amplitude, phase, and frequency characteristics;

selectively combining the plurality of different output signals produced by the corresponding plurality of transducers to form a composite output signal exhibiting all of the amplitude, phase, and frequency characteristics of said complex accoustical seismic signal; and recording values of amplitude, phase, and frequency of said complex accoustical seismic signal.

2. A seismic survey method as in claim 1, wherein said plurality of transducers are positioned in a body of water.

3. A seismic survey method as in claim 1, wherein the step of selectively combining the plurality of different output signals further comprises the steps of isolating and removing an undesirable signal from a desirable signal within said composite output signal.

4. A seismic survey method as in claim 1, wherein the step of selectively combining the plurality of different output signals is performed at a receiver site.

5. A seismic survey method as in claim 1, wherein the step of selectively combining the plurality of different output signals is performed at a location other than a receiver site.

6. A seismic survey method as in claim 1, wherein each of said plurality of different output signals is formed from selected linear and nonlinear amplitude and phase portions of those different output signals.

7. A seismic survey method as in claim 1, wherein the step of selectively combining each of said plurality of different output signals further comprises the step of time multiplexing the plurality of different output signals.

8. A seismic survey method as in claim 1, wherein the step of selectively combining each of said plurality of different output signals further comprises the step of frequency multiplexing the plurality of different output signals.

9. A seismic survey method as in claim 1, wherein the step of selectively combining each of said plurality of different output signals further comprises grouping the plurality of different output signals into selected bands.

10. A method of conducting a modulated seismic survey comprising the steps of:
  positioning a plurality of seismic transducers, each of which has an associated different resonant frequency, for receiving a modulated complex accoustical signal comprised of different frequency signals;
  transmitting a modulated seismic source signal into the earth; and
  recording indications of reflected and refracted seismic signals received by said plurality of seismic transducers in response to said modulated seismic source signal.

11. A method of conducting a modulated seismic survey as in claim 10, further comprising the step of filtering said modulated complex acoustical signal received by said seismic transducers.

12. A method of conducting a modulated seismic survey as in claim 10, wherein said modulated seismic source signal comprises a plurality of different monotone seismic energy signals.

13. A method of conducting a modulated seismic survey as in claim 10, wherein said modulated seismic source signal comprises a pulse modulated signal.

14. A method of conducting a modulated seismic survey as in claim 10, further comprising the step of demodulating the recorded indications of reflected and refracted seismic signals sensed by said plurality of seismic transducers.

15. A seismic survey method as in claim 1, wherein the step of selectively combining the plurality of different output signals further comprises the step of analyzing the phase characteristics of said composite output signal.

16. A seismic survey method as in claim 1, wherein the step of selectively combining the plurality of different output signals further comprises the step of analyzing the frequency characteristics of said composite output signal.

17. A seismic survey method as in claim 1, wherein the step of selectively combining the plurality of different output signals further comprises the step of analyzing the amplitude characteristics of said composite output signal.

18. A seismic survey method as in claim 1, wherein the step of selectively combining the plurality of different output signals further comprises the step of determining a propagation time of said composite output signal.

19. A seismic survey method as in claim 1, wherein the step of selectively combining the plurality of different output signals further comprises the step of determining a propagation time of individual ones of said plurality of different output signals.

20. A seismic survey method as in claim 1, wherein the step of selectively combining each of said plurality of different output signals further comprises the step of wavelength multiplexing the plurality of different output signals.

21. A seismic survey method as in claim 1, wherein the complex accoustical seismic signal comprises a carrier signal modulated with seismic information.

22. A method of conducting a modulated seismic survey as in claim 10, wherein the plurality of different frequency signals is employed to demodulate the received modulated complex accoustical signal.

23. A method of conducting a modulated seismic survey as in claim 10, wherein said modulated seismic source signal comprises an angle modulated seismic source signal.

24. A method of conducting a modulated seismic survey as in claim 13, wherein said pulse modulated signal comprises a series of pulses of seismic energy selectively spaced in time.

25. A seismic survey method as in claim 1, wherein said plurality of different output signals form one or more directional components.

26. A seismic survey method as in claim 25, wherein said one or more directional components define said plurality of different output signals in terms of orthogonal directions.

27. A seismic survey method as in claim 1 wherein the step of selectively combining the plurality of different output signals further comprises the steps of separating a desirable seismic signal from each of the plurality of different output signals and combining each of the separated desirable signals.

28. A seismic survey method as in claim 1, further comprising the step of separating a desirable seismic signal from said composite output signal.

* * * * *